US011736770B2

(12) United States Patent
Satish (10) Patent No.: US 11,736,770 B2
(45) Date of Patent: Aug. 22, 2023

(54) AUTOMATIC DETERMINATION AND RETRIEVAL OF A FAVORITE CHANNEL

(71) Applicant: Universal Electronics Inc., Santa Ana, CA (US)

(72) Inventor: Ramaiah Satish, Bangalore (IN)

(73) Assignee: Universal Electronics Inc., Santa Ana, CA (US)

( * ) Notice: Subject to any disclaimer, the term of this patent is extended or adjusted under 35 U.S.C. 154(b) by 0 days.

(21) Appl. No.: 17/507,233

(22) Filed: Oct. 21, 2021

(65) Prior Publication Data

US 2022/0046323 A1 Feb. 10, 2022

Related U.S. Application Data

(63) Continuation of application No. 16/586,071, filed on Sep. 27, 2019, now Pat. No. 11,184,674, which is a continuation of application No. 15/624,951, filed on Jun. 16, 2017, now Pat. No. 10,462,525, which is a continuation of application No. 14/538,383, filed on Nov. 11, 2014, now Pat. No. 9,712,875, which is a continuation of application No. 13/864,724, filed on Apr. 17, 2013, now Pat. No. 8,941,531, which is a continuation of application No. 12/315,169, filed on Nov. 28, 2008, now Pat. No. 8,427,356.

(51) Int. Cl.
*H04N 21/466* (2011.01)
*H04N 21/422* (2011.01)
*H04N 21/442* (2011.01)

(52) U.S. Cl.
CPC ... *H04N 21/4667* (2013.01); *H04N 21/42227* (2013.01); *H04N 21/44204* (2013.01); *H04N 21/44222* (2013.01); *H04N 21/466* (2013.01)

(58) Field of Classification Search
CPC ............. H04N 21/4667; H04N 4/2227
See application file for complete search history.

(56) References Cited

U.S. PATENT DOCUMENTS

| 5,414,426 | A | 5/1995 | O'Donnell et al. |
| 6,438,752 | B1 | 8/2002 | McCiard |
| 6,456,338 | B1 * | 9/2002 | Yuen ............... H04N 21/47 348/731 |
| 6,724,339 | B2 | 4/2004 | Conway et al. |
| 6,750,802 | B1 | 6/2004 | Olen |
| 6,934,917 | B2 | 8/2005 | Lin |
| 7,061,549 | B1 | 6/2006 | Mabon |
| 7,284,256 | B2 | 10/2007 | Candelore et al. |
| 8,427,356 | B1 | 4/2013 | Satish |

(Continued)

*Primary Examiner* — Scott Bauer
(74) *Attorney, Agent, or Firm* — Greenberg Traurig, LLP (57) ABSTRACT

A consumer electronic device tracks the current channel to which the electronic consumer device is tuned. The consumer electronic device determines an amount of time that the current channel remains unchanged. Based at least in part on this amount of time, the consumer electronic device determines whether the current channel should be stored as a favorite channel. When the consumer electronic device subsequently receives a favorite channel command, the consumer electronic device is caused to tune to the favorite channel that is currently stored in memory. Changing user preferences are thus automatically accommodated without manual intervention, resulting in an effortless user interface.

19 Claims, 6 Drawing Sheets

(56) References Cited

U.S. PATENT DOCUMENTS

| | | |
|---|---|---|
| 2001/0017672 A1 | 8/2001 | Verhaeghe |
| 2002/0188948 A1 | 12/2002 | Florence |
| 2003/0115589 A1* | 6/2003 | D'Souza ............ H04N 21/4532 |
| | | 725/9 |
| 2003/0149675 A1 | 8/2003 | Ansari et al. |
| 2003/0233664 A1 | 12/2003 | Huang et al. |
| 2004/0019907 A1 | 1/2004 | Li et al. |
| 2004/0032538 A1 | 2/2004 | Yuen |
| 2004/0040039 A1 | 2/2004 | Bernier |
| 2006/0184967 A1 | 8/2006 | Maynard et al. |
| 2007/0006259 A1 | 1/2007 | Kurose et al. |
| 2007/0089140 A1 | 4/2007 | Li et al. |
| 2007/0118848 A1 | 5/2007 | Schwesinger et al. |
| 2007/0176820 A1 | 8/2007 | Vidal |
| 2007/0288987 A1 | 12/2007 | Kim et al. |
| 2010/0122291 A1 | 5/2010 | Lee |

\* cited by examiner

TIME RANKED FAVORITE CHANNEL LIST — 70

| LCC INDEX NUMBER | LCC | LCC ELAPSED TIME | TIME RANKING |
|---|---|---|---|
| 1 | CHANNEL 2 | 60 MINUTES | 2 |
| 2 | CHANNEL 5 | 90 MINUTES | 1 |
| 3 | CHANNEL 7 | 30 MINUTES | 3 |
| 4 | CHANNEL 9 | 14 MINUTES | 5 |
| 5 | CHANNEL 10 | 16 MINUTES | 4 |

FIG. 7

CHRONOLOGICALLY RANKED FAVORITE CHANNEL LIST — 80

| LCC INDEX NUMBER | LCC |
|---|---|
| 1 | CHANNEL 2 |
| 2 | CHANNEL 5 |
| 3 | CHANNEL 7 |
| ⋮ | ⋮ |
| N | CHANNEL 10 |

AUTOMATIC DETERMINATION AND RETRIEVAL OF A FAVORITE CHANNEL

RELATED APPLICATION DATA

This application claims the benefit of and is a continuation of U.S. application Ser. No. 16/586,071, filed on Sep. 27, 2019, which application claims the benefit of and is a continuation of U.S. application Ser. No. 15/624,951, filed on Jun. 16, 2017, which application claims the benefit of and is a continuation of U.S. application Ser. No. 14/538,383, filed on Nov. 11, 2014, which application claims the benefit of and is a continuation of U.S. application Ser. No. 13/864,724, filed on Apr. 17, 2013, which application claims the benefit of and is a continuation of U.S. application Ser. No. 12/315,169, filed on Nov. 28, 2008, the disclosures of which are incorporated herein by reference in their entirety.

TECHNICAL FIELD

The disclosed embodiments relate to the field of remote control devices, more specifically, to the automatic tracking, storing, and retrieving of frequently viewed channels.

BACKGROUND

A universal remote control (URC) device transmits operational signals to control one or more electronic consumer devices. Examples of electronic consumer devices include televisions, video cassette recorders, set-top boxes, audio home theatre systems, and CD/DVD players. Many users of electronic consumer devices such as televisions use URC devices to frequently change channels. Often consumers change channels to avoid watching uninteresting content, such as television advertisements or promotional clips, which periodically interrupt the presentation of interesting content. In the context of television viewing, this behavior is popularly referred to as "channel surfing".

In a common scenario of channel surfing, a viewer is engaged in a particular program for an extended period of time, for instance fifteen to twenty minutes. The programming will then be interrupted by advertising or promotional content. In response, the viewer will "surf" through a sequence of channels until the viewer finds something to watch that is more interesting than the commercial or promotional clips.

The viewer typically "surfs" with the aid of a URC either by explicitly entering particular channel numbers or by incrementally changing the channel using a channel up/down button. After a period of "surfing" the user will very often want to return to the initial program, estimating that by this time the advertisements are finished and the initial interesting program is being presented once again.

To return to the initial program using a typical URC the viewer must both recall and explicitly enter the channel associated with the initial program or repeatedly increment the channel number until the initial program appears. Both of these approaches complicate the user experience. First, the user may forget the channel number of the initial program. Second, entering the channel number on a small keypad often requires the user to focus attention to the URC itself to make the correct sequence of key presses. Using a channel up/down button, a user may have to increment through many channels to return to the original program. Both of these approaches cause viewer frustration and loss of viewing time.

In an attempt to avoid such frustration and loss of viewing time, a viewer may explicitly program an association between a key and a particular channel such that upon a subsequent pressing of the key the URC transmits a "macro" of operational signals to the television such that the television is tuned to the preprogrammed particular channel. A problem with this approach is that the programming sequence is typically a time consuming sequence of keystrokes that a user should memorize. In addition, any change in a user's preferred channel requires the association to be manually reprogrammed. As a result of these problems many viewers choose not to utilize the macro key functionality of a URC.

SUMMARY

A novel remote control device includes a microcontroller integrated circuit and a favorite key. In one embodiment, the remote control device is usable to control an electronic consumer device such as a television. The microcontroller waits for a user channel selection input and determines if the favorite key has been pressed. If the microcontroller determines that the favorite key has been pressed, then the microcontroller uses a stored codeset to generate an operational signal that carries an indication of a Favorite Channel (FC) associated with the favorite key. The operational signal is communicated from the remote control device to the electronic consumer device and causes the electronic consumer device to tune to the FC.

As the remote control device is used, the microcontroller automatically tracks and stores the Likely Current Channel (LCC) to which the electronic consumer device is likely tuned. The microcontroller measures the amount of time the LCC was selected and may also record other information. In one embodiment, the microcontroller uses this timing information to determine if a particular LCC qualifies as a Favorite channel (FC) by determining if the LCC has remained unchanged for more than a minimum threshold period of time. In another embodiment, a FC is not determine by the amount of time the LCC has remained unchanged but rather is determined by a total cumulative amount of time the LCC has been selected in a given period of time. The microcontroller may store a list of such FCs. The microcontroller may also automatically rank FCs in the list by the amount of time each channel remained unchanged. Alternatively, the microcontroller may automatically rank FCs chronologically based on when the FCs were determined to be in the list.

The novel integrated circuit eliminates the need for complex user programming of universal remote control devices. The remote control user simply navigates through channels normally. The remote control device automatically detects, stores, and ranks FCs.

When the user subsequently presses the favorite channel key on the remote control device, the remote control device accesses the list of FCs, retrieves an FC value, and uses this FC value to generate an operational signal that carries the FC value to the electronic consumer device to be controlled. The operational signal causes the electronic consumer device (for example, a television) to be tuned to the FC.

In one example, successive pressings of the favorite key by the user causes the remote control device to generate and transmit a succession of operational signals, one operational signal for each FC in the list. Because the ranking of FCs is automatically updated within the remote control device over time, changing user preferences are automatically accommodated without manual intervention, resulting in an effortless user interface. Advantageously, the novel FC determining functionality can be implemented into remote control devices with little or no additional cost.

In some embodiments the tracking of the amount of time that the LCC is unchanged, and the associated determination of an FC, and the storage of FCs, is performed by the electronic consumer device to be controlled rather than by the remote control device. When a user presses a favorite key on the remote control device, the remote control device sends a communication to the electronic consumer device. In response to this communication, the electronic consumer device accesses the stored FC information and uses it to tune to the FC.

Other structures and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
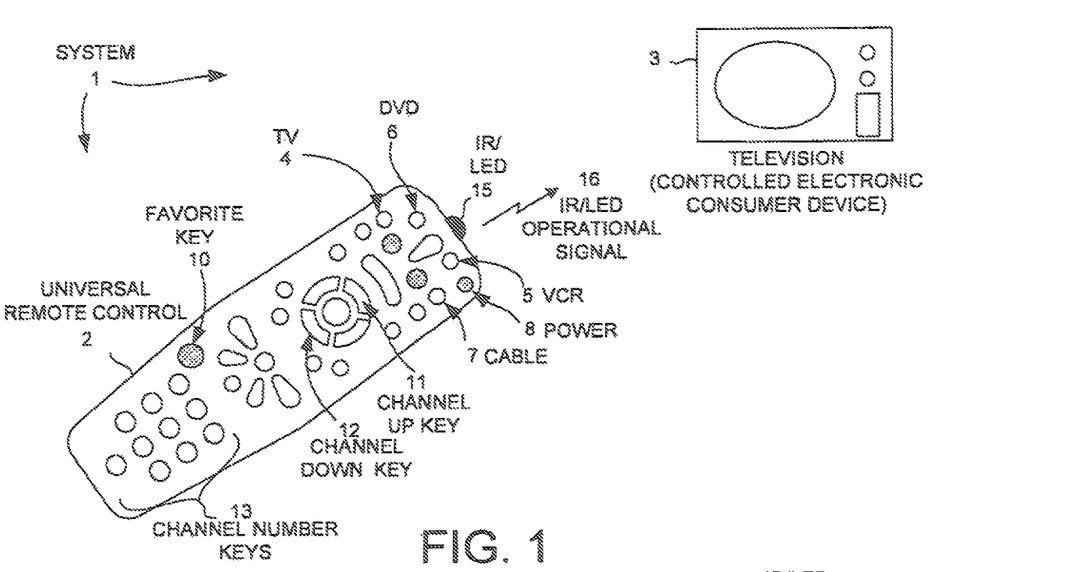
FIG. 1 is a diagram illustrative of a remote control system.

FIG. 1 is a diagram of a system 1 including a universal remote control (URC) device 2 and a television 3 in accordance with one novel aspect. URC 2 includes an IR/LED 15 and various device-keys and function-keys. As illustrated in FIG. 1, examples of device-keys are TV key 4, VCR key 5, DVD key 6, and CABLE key 7. Examples of function-keys are POWER key 8, CHANNEL UP key 11, CHANNEL DOWN key 12, CHANNEL NUMBER keys 13, and FAVORITE key 10. When a user presses a key on URC 2, if URC 2 is programmed to control a particular electronic consumer device, for example, television 3, then IR/LED 15 transmits IR/LED operational signal 16 to control television 3 corresponding to the pressed key. In one advantageous aspect, when he FAVORITE key 10 is pressed, URC 2 generates an IR/LED operational signal 16 that carries an indication of the favorite channel.

Figure 2:
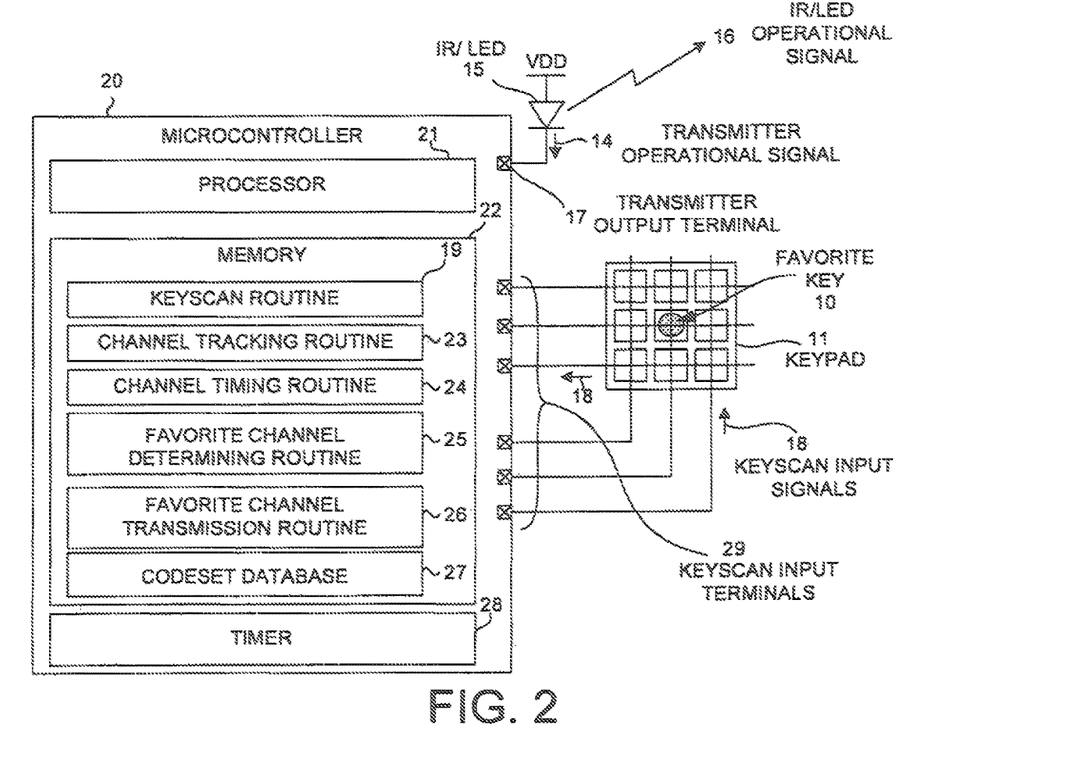
FIG. 2 is a diagram illustrative of a novel integrated circuit in the context of the remote control system of FIG. 1.

FIG. 2 is a simplified block diagram of one embodiment of URC 2 of FIG. 1. URC 2 includes keypad 11, IR/LED 15, and a microcontroller 20. Microcontroller 20 includes a processor 21, a memory 22, a timer 28, keyscan input terminals 29, and transmitter output terminal 17. A processor-readable medium may include optically based storage components, such as a compact disc, or magnetically based storage components, such as a hard disk or flash memory. Memory 22 includes channel tracking routine 23, channel timing routine 24, favorite channel determining routine 25, favorite channel transmission routine 26, and codeset database 27. Keypad 11 includes all of the keys of URC 2 such as channel number keys 13, favorite key 10, etc.

In one embodiment the keyscan input signals 18 are read by processor 21 via keyscan input terminals 29. The processor 21 runs a keyscan routine 19 to determine a particular keypress from the keyscan input signal values. For instance, the pressing of favorite key 10 may be determined by reading a particular set of keyscan input signals. Depending on the particular keypress the processor may run:

a) channel tracking routine 23 to track the likely current channel (LCC),
b) channel timing routine 24 which references timer 28 to determine the amount of time a channel was the LCC,
c) favorite channel determining routine 25 to determine if a channel is a favorite channel, and
d) favorite channel transmission routine 26 to output a transmitter operational signal 14 via transmitter output terminal 17.

An IR/LED 15 converts the transmitter operational signal 14 into an IR/LED operational signal 16 to transmit an indication of a favorite channel to a controlled device such as television 3. A particular brand and model of electronic consumer device responds to IR/LED operational signals containing a particular set of keycodes and performs the corresponding functions. Various types of keycodes are stored in codesets as a codeset database 27. Each codeset is identified by a three digit codeset identifier associated with a particular brand and make of electronic consumer device. A URC 2 generally stores hundreds of codesets in a codeset database 27 and is programmed to use one particular codeset to control one particular electronic consumer device.

Figure 3:
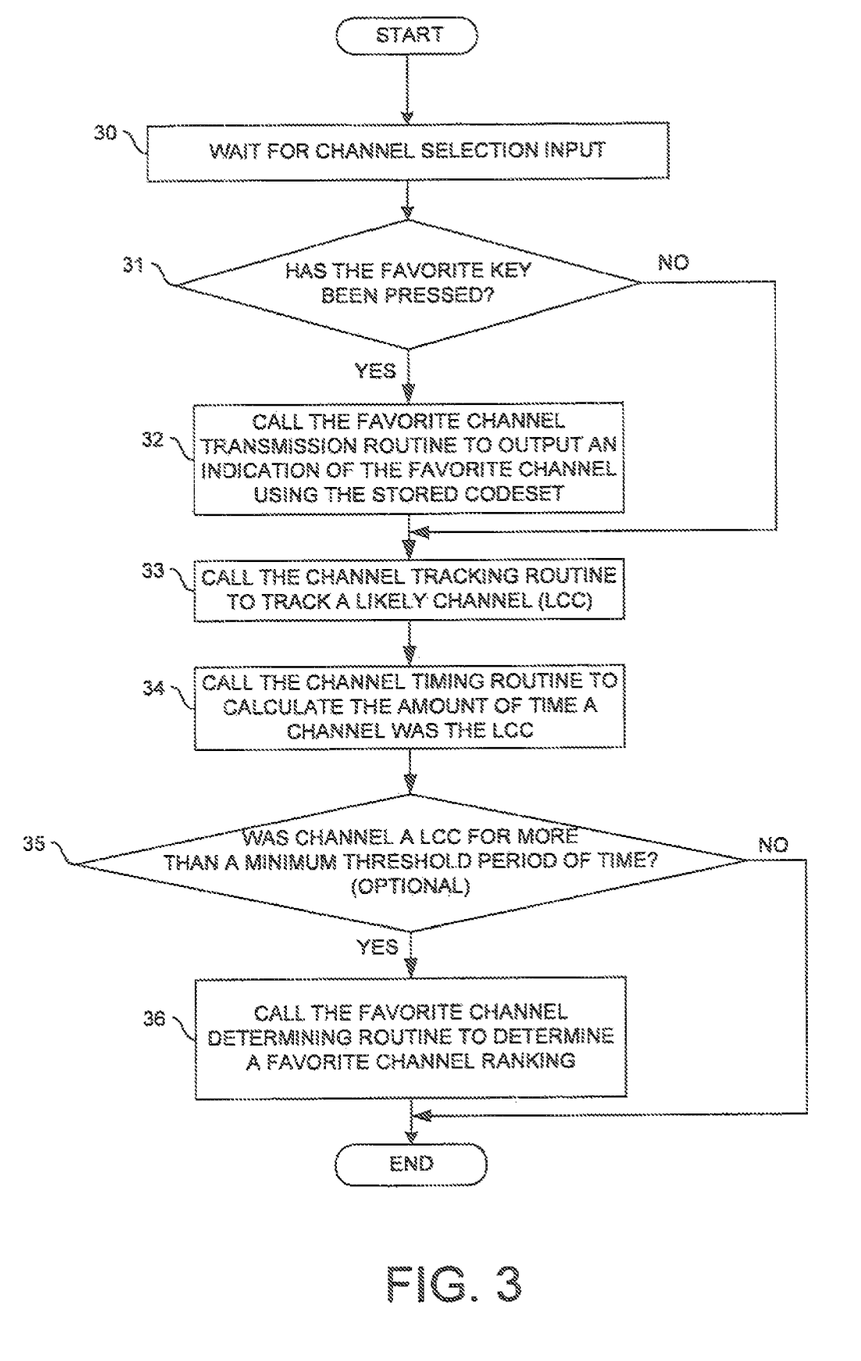
FIG. 3 is a simplified flowchart of a method of automatically determining, storing and retrieving favorite channels.

As illustrated in FIG. 3, processor 21 waits for a channel selection input 30. A channel selection input indicates a desire to set the channel. Typically, a channel selection input would result from a keypad button press of any of the URC keys that command a change of channel. The processor 21 determines whether the keypad button press corresponds with the favorite key 31. If the favorite key has been pressed, processor 21 proceeds to run the favorite channel transmission routine 32. The favorite channel transmission routine uses the stored codeset to output a transmitter operational signal associated with the favorite channel. Thus, the resulting IR/LED operational signal 16 is transmitted as a command to the controlled device to change to the favorite channel. If the favorite channel has not been pressed, processor 21 skips over the favorite channel transmission routine and calls the channel tracking routine 33 directly. Next, processor 21, runs the channel tracking routine 33 to track a likely current channel (LCC). The channel tracking routine monitors any change of channel keypress, interprets that as a change of channel, and updates the LCC to be the newly selected channel. Next, processor 21 runs the channel timing routine 34 to calculate the amount of time a channel was the LCC. To perform this function, the timer 28 is referenced to determine the amount of time a channel remained unchanged.

In one embodiment, following the channel timing routine, processor 21 determines whether a channel was the LCC for more than a minimum threshold period of time 35. The minimum threshold period of time may be selectable by the user. It may also be pre-programmed by the manufacturer. The minimum threshold period of time may be tuned to a typical interval of broadcast programming without commercial interruption. For instance the minimum threshold period of time may be 15 minutes. If processor 21 determines that a channel was not the LCC for more than the minimum threshold period of time, the channel is not considered a favorite channel and does not participate in a favorite channel ranking. If processor 21 determines that a channel is the LCC for more than the minimum threshold period of time, processor 21 calls the favorite channel determining routine 36. The favorite channel determining routine 36 ranks favorite channels so that a list of favorite channels is automatically generated. In another embodiment, following the channel timing routine, processor 21 calls the favorite channel determining routine without determining whether a channel was the LCC for more than a minimum threshold period of time.

Figure 4:
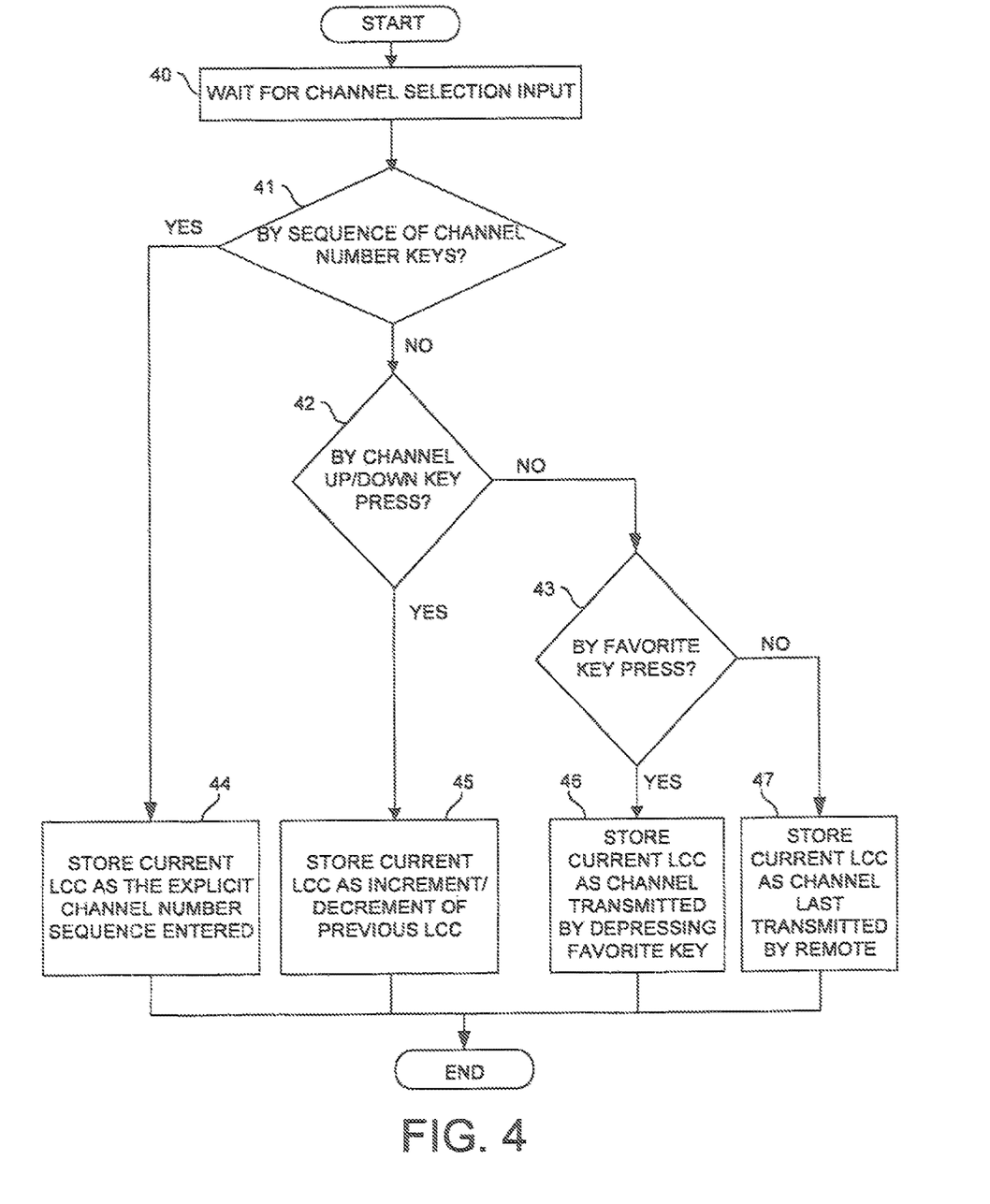
FIG. 4 is a simplified flowchart of a channel tracking routine in accordance with a novel aspect of FIG. 3.

FIG. 4 illustrates one embodiment of a channel tracking routine in more detail. Processor 21 waits for a channel selection input 40, then analyzes the type of channel selection input received to determine the likely current channel (LCC). For example, if the user pressed a sequence of channel number keys 13 to indicate a desire to change the channel 41, processor 21 would store the channel corresponding to the explicit channel number key sequence as the LCC 44. For example, if the user pressed the channel up key 11 (or the channel down key 12) to indicate a desire to change the channel 42, processor 21 would increment (or decrement) the previous LCC and store the result as the LCC 45. For example, if the user pressed the favorite key 10 to indicate a desire to change the channel 43, processor 21 would store the LCC as the channel transmitted by the favorite channel transmission routine as a result of depressing the favorite key 46. For example, if none of the favorite key, channel up/down keys, or the channel number keys are pressed, processor 21 stores the LCC as the channel last transmitted by the URC 47.

Figure 5:
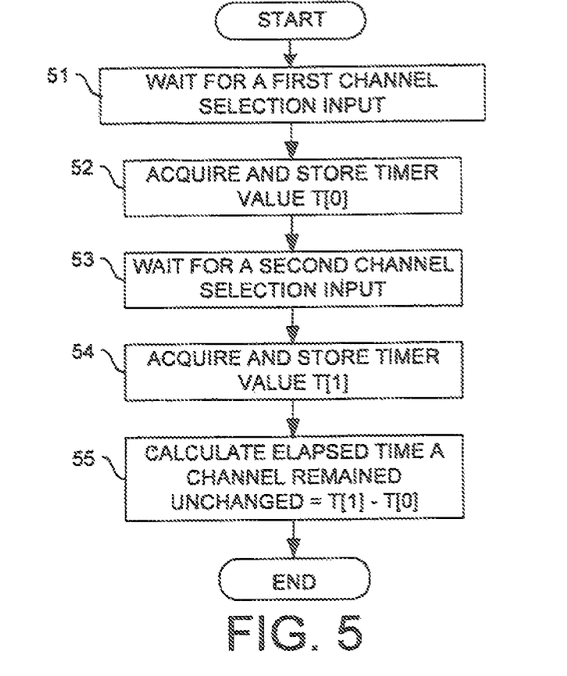
FIG. 5 is a simplified flowchart of a channel timing routine in accordance with a novel aspect of FIG. 3.

FIG. 5 illustrates one embodiment of a channel timing routine. Processor 21 waits for a first channel selection input 51 then acquires and stores a first timer value T[O] 52. Timer value T[O] is an indication of time at the point of transition where a first channel becomes the LCC. Then processor 21 waits for a second channel selection input 53. When this second channel selection input is detected, processor 21 acquires and stores a second timer value T[1] 54. Timer value T[1] is an indication of time at the point of transition where a second channel becomes the LCC. Processor 21 then calculates the elapsed time that the first channel was the LCC by taking the difference in values between T[1] and T[O] 55.

Figure 6:
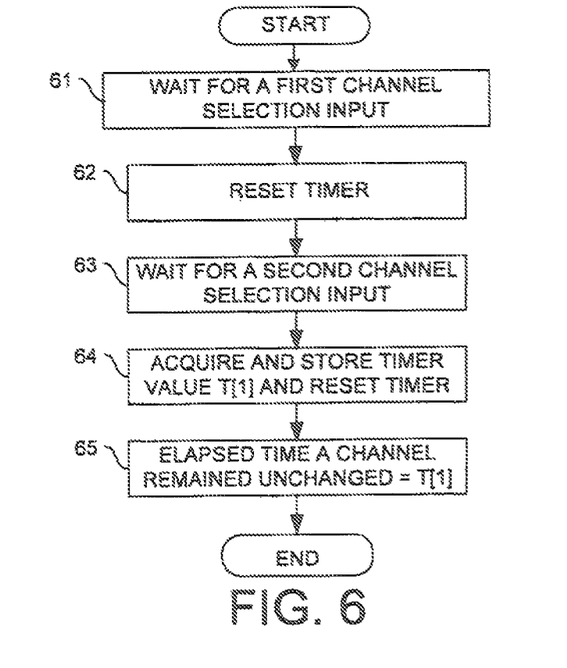
FIG. 6 is a simplified flowchart of a channel timing routine in accordance with another novel aspect of FIG. 3.

FIG. 6 illustrates another embodiment of a channel timing routine. Processor 21 waits for a first channel selection input 61 then resets the timer 62. Because of the reset, the indication of time at the point of transition where a first channel becomes the LCC is zero. Then processor 21 waits for a second channel selection input 63. When a second channel selection input is detected processor 21 acquires and stores a timer value T[1] and resets the timer 64. Timer value T[1] is both an indication of time at the point of transition where a second channel becomes the LCC and the elapsed time that the first channel was the LCC 65.

Figure 7:
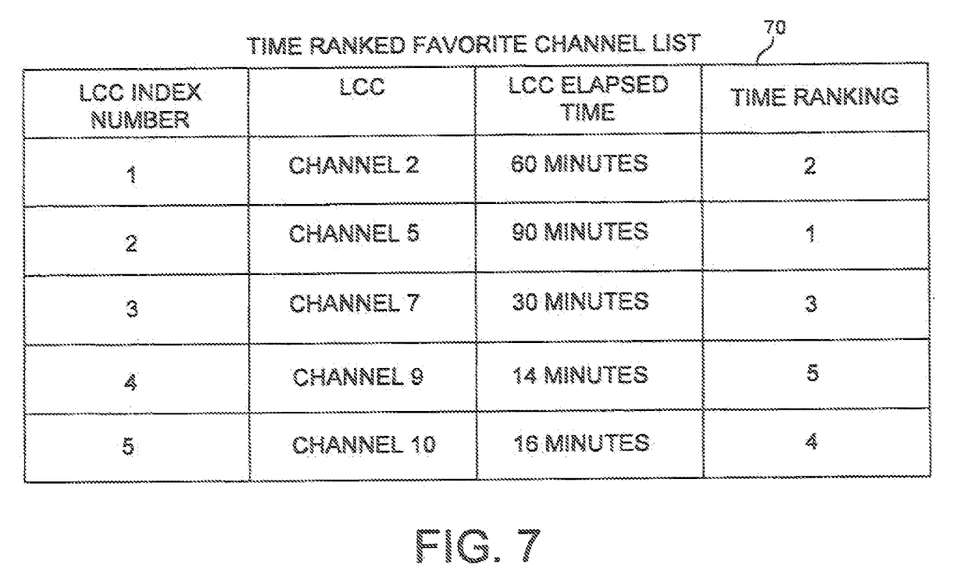
FIG. 7 is a table illustrative of a favorite channel determining routine in accordance with a novel aspect of FIG. 3.

FIG. 7 illustrates one embodiment of a favorite channel determining routine. A time-ranked favorite channel list 70 is compiled by appending the list at each change of LCC and represents a historical record of channels that were a LCC. Each row of the time-ranked favorite channel list 70 stores the index number of each change of LCC in chronological order, the channel number associated with each LCC, the elapsed time that the channel was the LCC, and the time ranking of that LCC. At each change of LCC, the time ranking of each LCC on the time-ranked favorite channel list 70 is recalculated. The list length can be one or greater than one. The list length is generally limited by memory 22 allocated in a specific design. Time ranking is in the order of the elapsed time of each LCC. For example, for a list length N, the LCC with the longest elapsed viewing time is assigned rank one and the LCC with the shortest elapsed viewing time is assigned rank N. For the particular example illustrated in FIG. 7, the list length N is five and the LCCs are time ranked according to their relative elapsed viewing time.

Figure 8:
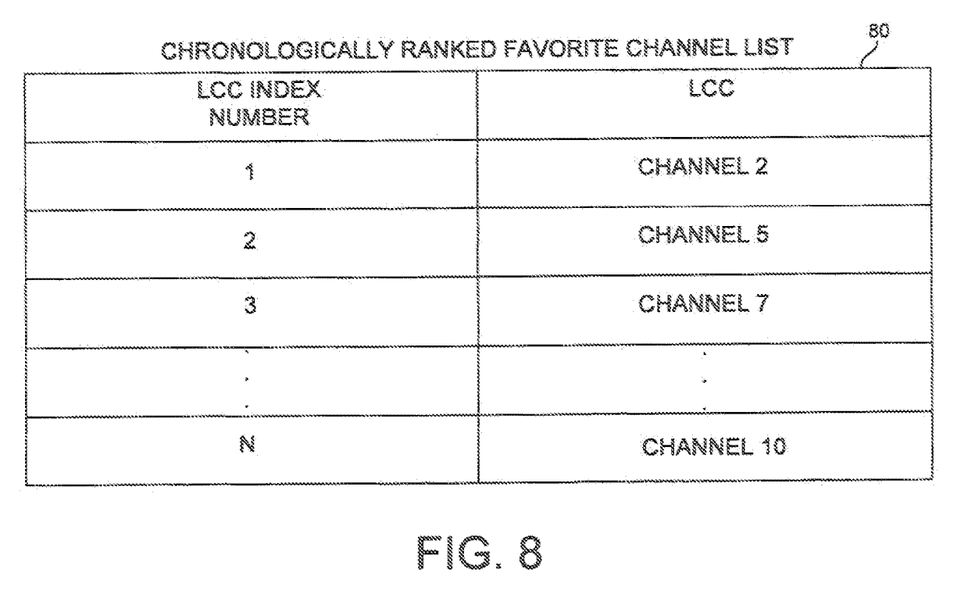
FIG. 8 is a table illustrative of a favorite channel determining routine in accordance with another novel aspect of FIG. 3.

FIG. 8 illustrates a second embodiment of a favorite channel determining routine. A chronologically ranked favorite channel list 80 is compiled by appending the list at each change of LCC where the list length N can be one or greater than one. The list length N is generally limited by memory 22 allocated in a specific design. Each row of the chronologically ranked favorite channel list 80 stores the index number of each change of LCC in chronological order and the channel number associated with each LCC. At each change of LCC, the chronological ranking of each LCC is indexed by one such that the channel that was most recently the LCC is assigned rank one.

Figure 9:
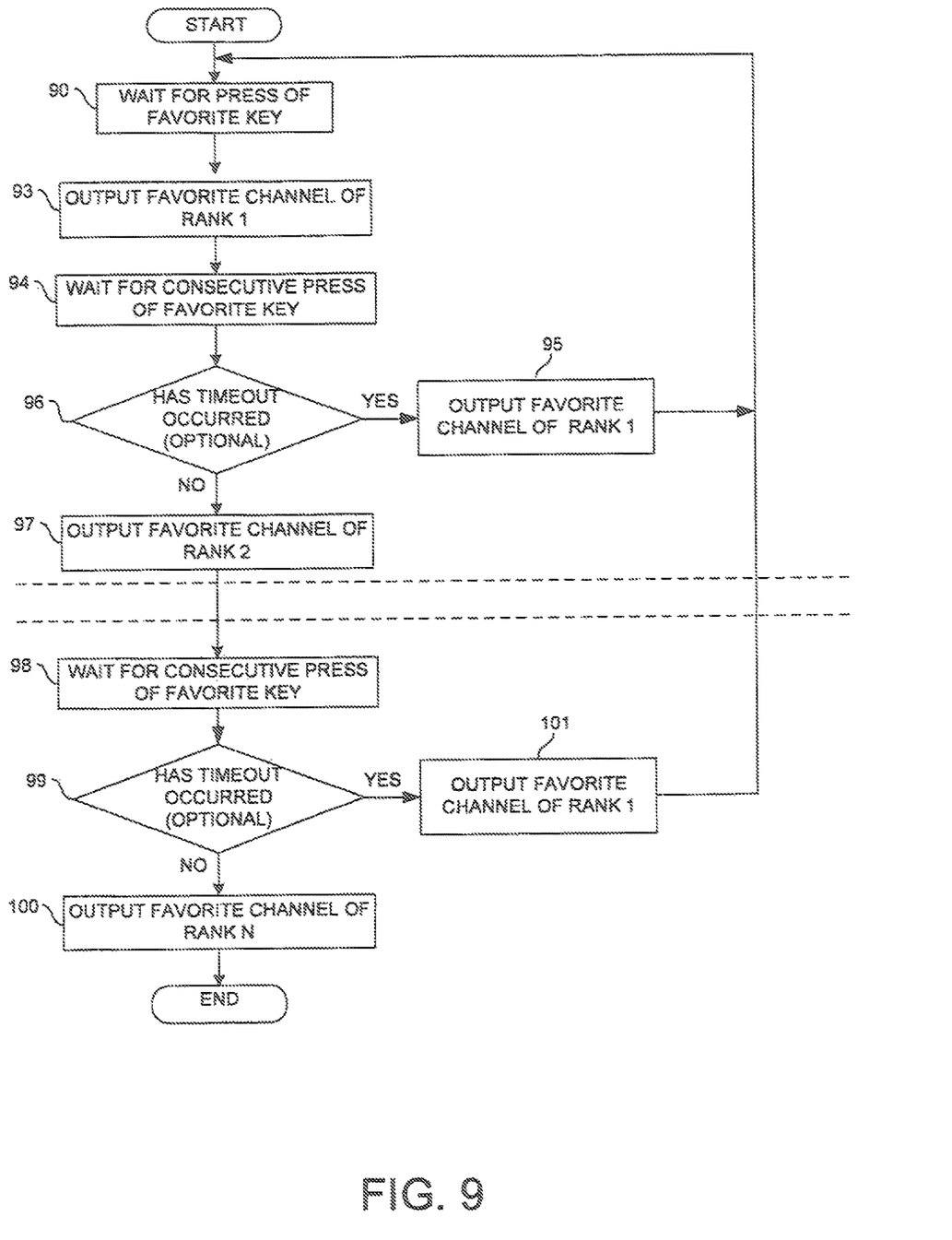
FIG. 9 is a simplified flowchart of a favorite channel transmission routine in accordance with a novel aspect of FIG. 3.

FIG. 9 illustrates one embodiment of a favorite channel transmission routine. Processor 21 waits for a press of the favorite key 90. Next, processor 21 outputs the favorite channel of rank 1 93. Processor 21 then waits for a consecutive press of the favorite key. Next, processor 21 determines if a favorite key timeout has occurred 96. A favorite key timeout occurs when the time between the current favorite key press and the previous favorite key press exceeds a prescribed period of time. The timeout period may be programmed by the user. It also may be pre-programmed by the manufacturer. For instance, if there is a list with many favorite channels, rapid, successive presses of the favorite key may indicate that the user wishes to cycle down the list of favorite channels. However, if a considerable period of time has elapsed since the previous favorite key press, the user may wish to simply view the highest ranking favorite channel. Thus, if a timeout has occurred, processor 21 outputs the favorite channel of rank 1 95. However, if a timeout has not occurred, processor 21 outputs the favorite channel of rank 2 97. As long as the favorite key is pressed consecutively, this routine continues through a list of favorite channels. Thus, processor 21 waits again for another consecutive favorite key press 98, determines if a timeout has occurred 99 and either outputs a favorite channel of rank 1 101 if a timeout has occurred or outputs a channel of rank N if a timeout has not occurred. The favorite channel transmission routine terminates if at any time a button other than the favorite key is pressed.

In another embodiment of a favorite channel determining routine, the timeout function may be eliminated and consecutive presses of the favorite button will pass through a list of favorite channels without regard for how much time has elapsed between consecutive presses of the favorite key.

Although certain specific embodiments are described above for instructional purposes, the teachings of this patent document have general applicability and are not limited to the specific embodiments described above. The functionality of microcontroller 20 may be implemented as an amount of programmable logic of a Field Programmable Gate Array (FPGA) architecture. The timer 28 may be integrated with the microcontroller or may communicate with the microcontroller as a peripheral device. Although the novel favorite channel determining and retrieving method is described above in connection with a universal remote control, the novel method sees general usage in channel switching applications. The novel method may, for example, be implemented in an electronic consumer device (for example, a television or set-top box) that is controlled by a remote control device. Accordingly, various modifications, adaptations, and combinations of various features of the described embodiments can be practiced without departing from the scope of the invention as set forth in the claims.

What is claimed is:

1. A non-transitory, computer readable media having instructions stored thereon which, when executed by a processing device of a controlling device, causes the controlling device to perform steps comprising:
storing in a memory of the controlling device in an ordered list data indicative of each of a plurality of content accessible via use of a consumer electronic device;
causing the consumer electronic device to access a first one of the plurality of content;
subsequently causing the consumer electronic device to access a second one of the plurality of content; and
in connection with causing the consumer electronic device to access the second one of the plurality of content, reordering the ordered list as a function of a measured time between causing the consumer electronic device to access the first one of the plurality of content and subsequently causing the consumer electronic device to access the second one of the plurality of content.

2. The non-transitory, computer readable media as recited in claim 1, wherein the consumer electronic device comprises a set-top box.

3. The non-transitory, computer readable media as recited in claim 1, wherein the consumer electronic device comprises a television.

4. The non-transitory, computer readable media as recited in claim 1, wherein the consumer electronic device is caused to access a first one of the plurality of content in response to an activation of a one or more channel selection input elements of the controlling device.

5. The non-transitory, computer readable media as recited in claim 1, wherein the time is measured by the controlling device.

6. The non-transitory, computer readable media as recited in claim 4, wherein the one or more channel selection input elements of the controlling device comprises a channel up input element and a channel down input element of the controlling device.

7. The non-transitory, computer readable media as recited in claim 4, wherein the one or more channel selection input elements of the controlling device comprises one or more channel number input elements of the controlling device.

8. The non-transitory, computer readable media as recited in claim 1, wherein the consumer electronic device is caused to access the first one of the plurality of content and subsequently caused to access the second one of the plurality of content via use of commands transmitted in accordance with an infrared communications protocol.

9. The non-transitory, computer readable media as recited in claim 1, wherein the consumer electronic device is caused to access the first one of the plurality of content and subsequently caused to access the second one of the plurality of content via use of commands transmitted in accordance with an radio frequency communications protocol.

10. The non-transitory, computer readable media as recited in claim 8, wherein the infrared communications protocol comprises a command code set selected from a library of command code sets stored in the memory of the controlling device.

11. The non-transitory, computer readable media as recited in claim 9, wherein the radio frequency communications protocol comprises a command code set selected from a library of command code sets stored in the memory of the controlling device.

12. The non-transitory, computer readable media as recited in claim 10, wherein the command code set selected from the library of command code sets stored in the memory of the controlling device comprises a command code set associated with a specified brand of a television.

13. The non-transitory, computer readable media as recited in claim 11, wherein the command code set selected from the library of command code sets stored in the memory of the controlling device comprises a command code set associated with a specified brand of a television.

14. The non-transitory, computer readable media as recited in claim 10, wherein the command code set selected from the library of command code sets stored in the memory of the controlling device comprises a command code set associated with a specified brand of a set top box.

15. The non-transitory, computer readable media as recited in claim 11, wherein the command code set selected from the library of command code sets stored in the memory of the controlling device comprises a command code set associated with a specified brand of a set top box.

16. The non-transitory, computer readable media as recited in claim 10, wherein the instructions use a received input to the controlling device to select the command code set from the library of command code sets stored in the memory of the controlling device.

17. The non-transitory, computer readable media as recited 16, wherein the received input to the controlling device comprises activation of one or more input elements of the controlling device adapted to command functional operations of the electronic consumer device.

18. The non-transitory, computer readable media as recited in claim 11, wherein the instructions use a received input to the controlling device to select the command code set from the library of command code sets stored in the memory of the controlling device.

19. The non-transitory, computer readable media as recited 16, wherein the received input to the controlling device comprises activation of one or more input elements of the controlling device adapted to command functional operations of the electronic consumer device.

* * * * *